US006466765B1

(12) United States Patent
Tanaka et al.

(10) Patent No.: US 6,466,765 B1
(45) Date of Patent: Oct. 15, 2002

(54) PORTABLE RADIO LISTENING STATUS RECORDER

(75) Inventors: Hiroshi Tanaka; Tatuo Asakura, both of Tokyo (JP)

(73) Assignee: K.K. Video Research, Tokyo (JP)

( * ) Notice: Subject to any disclaimer, the term of this patent is extended or adjusted under 35 U.S.C. 154(b) by 0 days.

(21) Appl. No.: 09/385,027

(22) Filed: Aug. 30, 1999

(30) Foreign Application Priority Data

Sep. 7, 1998 (JP) ........................................ 10-268949

(51) Int. Cl.$^{7}$ ................................................ H04B 7/00

(52) U.S. Cl. .......................... 455/2.01; 725/14; 725/24

(58) Field of Search ............................ 455/2.01, 179.1, 455/181.1, 188.1, 185.1, 186.1, 186.2, 187.1; 725/14, 24, 9, 11, 13

(56) References Cited

U.S. PATENT DOCUMENTS 4,955,070 A * 9/1990 Welsh et al. ............... 455/2.01
5,023,929 A * 6/1991 Call ............................ 725/14
5,483,276 A * 1/1996 Brooks et al. ................. 348/2
5,764,221 A * 6/1998 Willard ...................... 345/173
5,768,680 A * 6/1998 Thomas ........................ 725/14
5,826,164 A * 10/1998 Weinblatt .................. 455/2.01
5,839,050 A * 11/1998 Baehr et al. .................. 725/14
5,896,554 A * 4/1999 Itoh et al. .................. 455/2.01
5,913,204 A * 6/1999 Kelly ......................... 705/500
6,035,177 A * 3/2000 Moses et al. ................. 725/14
6,081,690 A * 6/2000 Worthy ........................ 725/14
6,324,266 B1 * 11/2001 Mannings ................ 379/92.04

* cited by examiner

*Primary Examiner*—Dwayne Bost
*Assistant Examiner*—Joy K. Contee
(74) *Attorney, Agent, or Firm*—Sughrue Mion, PLLC

(57) ABSTRACT

A portable recorder which is carried by a sample subject for a radio listener rating survey has a display unit and an input unit mounted on the front of a case and a processor built in the case. The processor comprises a data memory, data entry support means, data recording means, and a data readout means. The data entry support means displays the current date and time, a tuned station candidate and a place-of-listening candidate on the display unit, thereby supporting a user in his entering the listening start date and time, the name of the tuned station, the place of listening and the listening stop date and time via the input unit when he listened to a radio program at home or outdoors. The data recording means electronically records the radio listening status data containing values of respective items entered under the support of the data entry support means and finally determined by the user. The data recorded in the data memory can be read out into an external computer or the like by the data readout means.

10 Claims, 14 Drawing Sheets

FIG. 11

(a)

| | | | | | |
|---|---|---|---|---|---|
| HEADER | LISTENING START DATE AND TIME | NAME OF TUNED STATION | LISTENING SPOT | LISTENING STOP DATE AND TIME | FLAG |

(b)

| | | |
|---|---|---|
| HEADER | VIBRATION COUNT | PERIOD INFORMATION |

PORTABLE RADIO LISTENING STATUS RECORDER

BACKGROUND OF THE INVENTION (1) Field of the Invention

The present invention relates to a device for making a radio listener rating survey and, more particularly, to a portable radio listening status recorder.

(2) Description of the Prior Art

Radio listener rating surveys have generally been made on radios placed in subjects homes. In recent years, however, there have been more occasions of listening to radios not only at home but also in a car, in a train, at a coffee shop, at a campsite, and anywhere else. Hence, whether at home or not, and whether the radio to which a person is listening to is his or other person's radio, the importance of a survey on the radio listening status is rising.

A typical method for surveying the radio listening status is what is called a diary-type method. With this method, a rating company distributes questionnaires through researchers to subjects, asking them to conduct the survey. The subjects write down in the questionnaires by writing materials the names of radio stations to which they listened during the survey period, and the listening start and stop dates and times. After the expiration of the survey period the questionnaires are collected through the researchers to the rating company. The rating company statistically processes the radio listening statuses of the subjects to compute the listener ratings for each radio station.

On the other hand, there have been proposed several technologies for mechanically detecting the listening status on a specific radio. For example, Japanese Patent Application Laid-Open Gazette No. 327017/95 describes a technology by which of the station to which the car radio is tuned is specified by comparing sounds from the loudspeaker of the car radio and sounds from a beforehand prepared reference radio while tuning the reference radio to channels one after another, the name of the thus specified station being recorded in a memory. Such a technology is useful for conducting a survey on the listening status of a specific radio, but it cannot be applied to the survey on the radio listening status of unspecific radios for which the present invention is intended.

With the current state of the art, the survey on the radio listening status of unspecific radios to which subjects listen to as mentioned above rely on the dairy-type method. However, the existing diary-type survey method has such problems as mentioned below.

First, since the data on the radio listening status of the subjects is written down in questionnaires, all the pieces of data entered in the questionnaires need to be read out therefrom and electronified—this consumes much labor in the process of adding up the results of the questionnaire.

Another problem is that when the subject has no watch, he cannot accurately record the listening start and stop dates and times to the minute.

Another problem is that an error in the written radio listening status cannot immediately be corrected unless the user carries an eraser or the like.

Another problem is that even if there is a subject who leaves the questionnaire on a desk at one corner thereof and enters the whole listening status during the survey period in the questionnaire while recalling his memory just before the end of the survey period, the rating company cannot learn such a fact. No problem arises when the recorded listening status is correct, but in many cases, the record relying solely on the subject's memory is not correct. Such incorrect listening status data by the subject concerned must be excluded from the statistic processing and, if not excluded, its weight is reduced, and some other measures are needed, Another problem is that alterations in recorded data by a researcher during the collection of questionnaires could not be detected on the part of the rating company.

Still another problem is that in a situation where the subject cannot take a look at the display panel of a radio receiver as in the case where he is listening to a radio in a taxi or at a coffee shop or the like, it is necessary for the subject to determine the radio station from the contents of the program he is listening to and the radio program column of a newspaper or the like, and hence the tuned station cannot be specified immediately and accurately.

SUMMARY OF THE INVENTION

A first object of the present invention is to provide a portable radio listening status recorder which enables the subject to record radio listening status data in electronic form.

A second object of the present invention is to provide a portable radio listening status recorder which enables the subject to accurately enter the listening start and stop dates and times even if he does not carries a watch with him.

A third object of the present invention is to provide a portable radio listening status recorder which enables the subject to immediately correct his erroneously entered radio listening status data.

A fourth object of the present invention is to provide a portable radio listening status recorder which is equipped with a function of automatically recording data which can be used as a measure for estimating the credibility of recorded radio listening status data.

A fifth object of the present invention is to provide a portable radio listening status recorder which enables a rating company to recognize alterations made by a researcher in recorded data.

A sixth object of the present invention is to provide a portable radio listening status recorder which protects recorded data from alterations by a researcher.

A seventh object of the present invention is to provide a portable radio listening status recorder which enables the subject to specify his tuned station immediately and accurately.

According to a first aspect of the present invention, there is provided a portable recorder which is carried by the subject for making a survey on the radio listening status which comprises a display unit, an input unit and a processor, and wherein the processor comprises: a data memory; data entry support means for supporting the subject in his newly entering of radio listening status data containing items of at least the listening start date and time, the name of a tuned station, the place of listening and the listening stop date and time via the input unit; and data recording means for recording in the data memory the radio listening status data containing values of the items entered with the support of the data entry support means and finally determined by the subject.

According to a second aspect of the present invention, the recorder further comprises data readout means for reading out the data from the data memory for output to an external terminal.

According to a third aspect of the present invention, the data entry support means displays an input value candidate on the display unit on each input of each item and changes the input value candidate to the next candidate in response to instructions from the input unit.

According to a fourth aspect of the present invention, the data entry support means displays the current date and time as an input value candidate at the time of entering the listening start date and time and then sequentially changes the current date and time to the next candidate in response to instructions from the input unit and, at the time of entering the name of the tuned station, displays as an input value candidate the same tuned station name as contained in immediately previously recorded radio listening status data and then sequentially changes the tuned station to those contained in a list of preselected stations in response to instructions from the input unit.

According to a fifth aspect of the present invention, the data entry support means displays the current date and time as an input value candidate at the times of entering the listening start date and time and the listening stop date and time then sequentially changes said current date and time to the next candidate in response to instructions from the input unit and, at the times of entering the name of the tuned station and the place of listening, displays as input value candidates the same tuned station name and place of listening as contained in immediately previously recorded radio listening status data and then sequentially changes the tuned station and the place of listening to those contained in lists of preselected stations and places of listening in response to instructions from the input unit.

According to a sixth aspect of the present invention, the processor further comprises data correction support means for supporting the subject in his correcting of the radio listening status data recorded in the data memory, and the data correction support means displays, as an input value, a value of a radio listening status data item to be corrected on the display unit in response to instructions from the input unit and then sequentially changes the input value in response to instructions from the input unit, updating the old input value with an input value finally determined by the subject.

According to a seventh aspect of the present invention, the recorder further comprises a vibration sensor connected to the processor, and the processor further comprises: vibration count accumulate means for accumulating, at predetermined time intervals at least from the radio listening status survey start time to the stop time, the numbers of vibrations detected by the vibration sensor during the respective time intervals; and vibration status recording means for recording in the data memory an accumulated value of vibration counts obtained by the vibration count accumulate means for each predetermined period of time.

According to an eighth aspect of the present invention, the processor further comprises marking means for appending a special mark to radio listening status data recorded by the data recording means in the data memory after the radio listening status survey top time.

According to a ninth aspect of the present invention, the processor further comprises inhibit means for inhibiting recording of new radio listening status data in the data memory after the radio listening status survey stop time.

According to a tenth aspect of the present invention, the processor further comprises marking means for appending a special mark to that radio listening status data stored in the data memory which was corrected by the data correction support means after the radio listening status survey stop time.

According to an eleventh aspect of the present invention, the processor further comprises inhibit means for inhibiting the correction of radio listening status data by the data correction support means after the radio listening status survey stop time.

According to a twelfth aspect of the present invention, the recorder further comprises a radio receiver and the processor further comprises radio control means for controlling the radio receiver to select the radio station of the name displayed on the display unit.

The portable radio listening status recorder according to the present invention is distributed via a researcher to each subject from a rating company. The subject carries the recorder with him during a predetermined period of survey and enters data as required. That is, when starting to listen to a radio program at his home, in a car, or outdoors, the subject enters, by manipulating the input unit, the listening start date and time, the name of the station to which he is listening, and the place of listening and, when stopping to listen to the radio program, enters the listening stop date and time by manipulating the input unit.

With the recorder according to the first aspect of the invention, the data entry support means supports the subject in his entering of the radio listening status data, and the data recording means records the entered data in the data memory. By this, the radio listening status data is electronically recorded on the part of the subject.

With the recorder according to the second aspect of the invention, the radio listening status data electronically recorded in the data memory is read out therefrom by the data readout means and provided to the external terminal. By reading out stored contents of the data memory after collecting the recorders, the rating company is enabled to immediately process their recorded data by a computer—this significantly saves the labor involved in adding up the processed results.

With the recorder according to the third aspect of the invention, the data entry support means displays an input value candidate on the display unit on each input of each of the items on the listening start and stop date and time, the name of the tuned station, the place of listening and the listening stop date and time, and then changes the input value to the succeeding candidates one after another in response to instructions from the input unit. Accordingly, if the input value candidate displayed first is the desired value, the subject needs only to determine it through the input unit, and if not, the subject changes the input value to the succeeding candidates in a sequential order and, when the desired input value is displayed, determines it through the input unit.

With the recorder according to the fourth aspect of the invention, since the current date and time are displayed as an input value candidate at the time of entering the listening start date and time, it is possible to accurately enter the listening start date and time. Furthermore, since the displayed current date and time can be changed in response to instructions from the input unit, the listening start date and time, even if left unrecorded, can be recorded afterward by turning back the displayed date and time. And, at the time of entering the name of the tuned station, the name of the same tuned station as that contained in the immediately recorded radio listening status data is displayed as a candidate for the input value—this simplifies the data entry when the same station is tuned at some time intervals.

With the recorder according to the fifth aspect of the invention, since the current date and time are displayed as an input value candidate at the time of entering the listening stop date and time, it is possible to accurately enter the listening stop date and time. Furthermore, since the displayed current date and time can be changed in response to instructions from the input unit, the listening stop date and time, even if left unrecorded, can be recorded afterward by turning back the displayed date and time. And, at the time of entering the place of listening, the name of the same place as that contained in the immediately recorded radio listening status data is displayed as a candidate for the input value—this simplifies the data entry when the same station is tuned at some time intervals.

With the recorder according to the sixth aspect of the invention, the data correction support means permits immediate correction of erroneously entered radio listening status data.

The recorder according to the seventh aspect of the invention is provided with the vibration sensor, the vibration count accumulate means and the vibration status recording means. If the subject does not carry the recorder with him and leaves it on a desk to the moment just before the expiration of the survey period, no vibration occurs in the recorder, and consequently, the vibration count for each predetermined time recorded in the data memory becomes substantially zero during that period. However, when the radio listening status date of every day during the survey period is recorded in the recorded data, it can be assumed that the subject entered the entire data just before the end of the survey period. That is, the accumulated value of the vibration counts detected at predetermined time intervals can be used as a measure for estimating the credibility of the radio listening status data recorded in the recorder. Incidentally, the time for accumulating the vibration counts can be set to be 24 hours, for instance, but it may also be made shorter.

With the recorder according to the eighth aspect of the present invention, if the researcher newly enters additional radio listening status data after collecting the recorder, the data is appended with a mark, thereby enabling the rating company to recognize the additional entry of data.

With the recorder according to the ninth aspect of the invention, since new radio listening status data cannot be registered after the survey stop time, it is possible to prevent the researcher from additionally entering new radio listening status data.

With the recorder according to the tenth aspect of the invention, if the researcher makes alterations in the subject's recorded radio listening status data after collecting the recorder from the subject, the altered data is appended with a mark, making it possible for the rating company to find the fact of alteration.

With the recorder according to the eleventh aspect of the invention, since the radio listening status data cannot be changed after the survey stop time, the radio listening status data can be protected from alterations by the researcher.

With the recorder according to the twelfth aspect of the invention, when the subject cannot specify which station he is listening to at the time of entering the name of the station, the radio receiver is tuned to the station whose name is currently displayed when the data entry support means displays a candidate for the name of the station and sequentially changes the name of station in response to instructions from the input unit. Hence, by comparing sounds of the radio program received by the radio receiver of the recorder and the sounds of the radio program to which the subject is listening, he can specify the station immediately and accurately—this increases the reliability of the data on the name of the station to which the subject is listening.

BRIEF DESCRIPTION OF THE DRAWINGS

FIG. 11(*a*) is a diagram depicting an example of the format of a radio listening status data record;

FIG. 11(*b*) is a diagram depicting an example of the format of a vibration count data record;

DETAILED DESCRIPTION OF THE PREFERRED EMBODIMENTS

Figure 1:
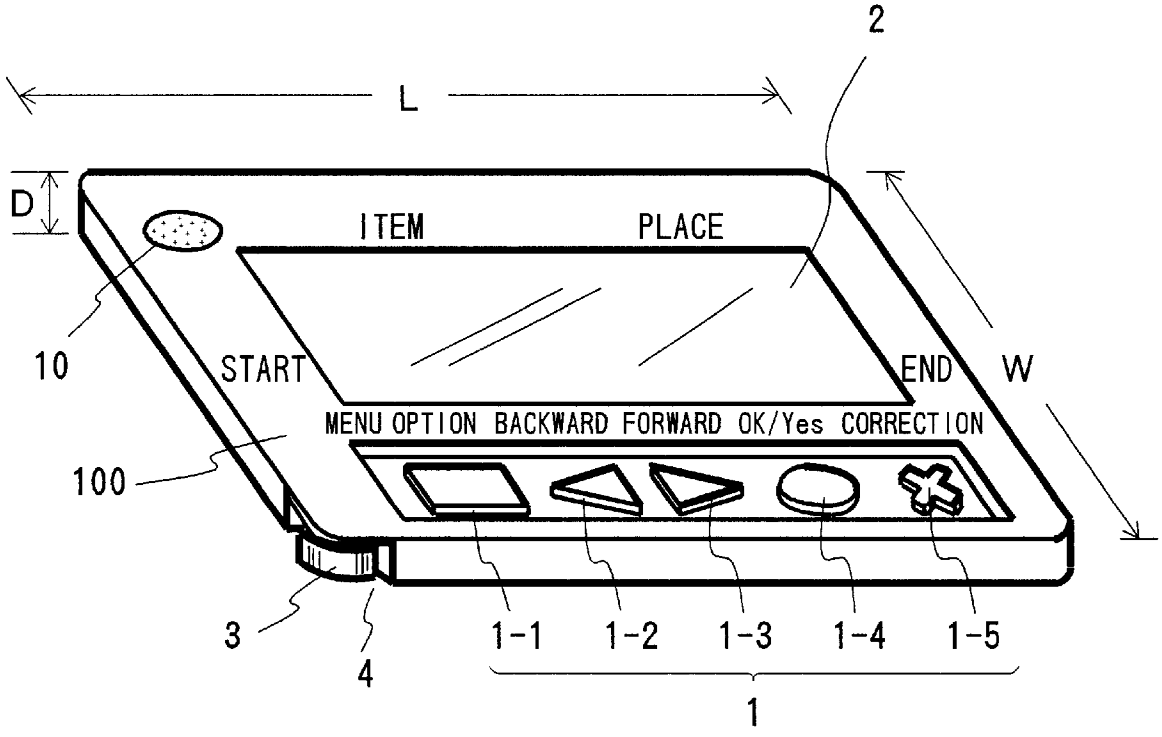
FIG. 1 is a perspective view showing the external view of an embodiment of the portable radio listening status recorder according to the present invention.

Referring to FIG. 1, the portable radio listening status recorder according to the present invention has necessary parts placed on and built in a lightweight, easy-to-carry, card-like case 100 which measures, for example, about 10 cm in length (L), about 6 cm in width (W) and about 1 cm in thickness (D).

On the front of the case 100 there are mounted an input unit 1 for a user to enter various instructions into the device, a display screen of a display unit (for example, an LCD) 2 for providing the user with various pieces of information from the device, and a beeper 10 which beeps on each manipulation of the input unit 1. At one corner of the case 100 there is a storage space 4 where to take up and store a cord of an earphone 3 of a built-in radio receiver. On the back of the case 100, though not shown, there is mounted a terminal through which data stored in a built-in data memory is read out therefrom for input into an external computer.

The input unit 1 in the illustrated embodiment has five push-buttons 1-1 to 1-5. The push-button 1-1 is a menu option button for selecting a menu item from among the listening start date and time, the name of tuned or selected broadcasting station, the place of listening, the listening stop date and time and data reverse. A push of this button 1-1 will shift from one menu item to another. The backward button 1-2 and the forward button 1-3 are to move the entered value of the selected item backward and forward one by one, respectively. The OK button 1-4 is to determine the selected input value. The correction button 1-5 is to indicate the selected item as an object to be corrected.

Figure 2:
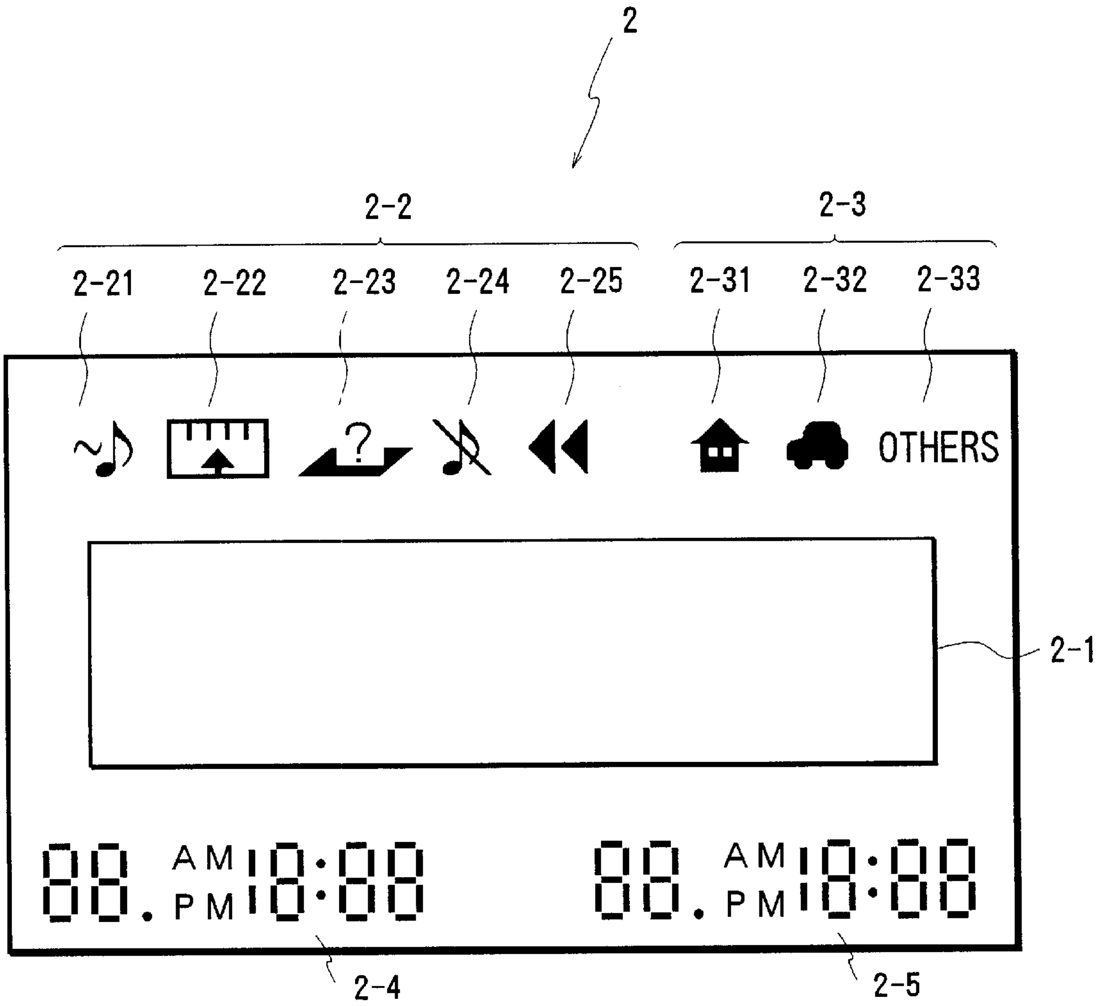
FIG. 2 is a layout plan of the display screen of a display unit.

Turning to FIG. 2, the display screen of the display unit 2 is composed of a dot matrix character display area 2-1 disposed centrally thereof, an item icon set 2-2 and a listening spot icon set 2-3 disposed at the top of the screen, a finalized listening start date and time display area 2-4 at the lower left-hand side and a finalized listening stop date and time display area 2-5 at the lower right-hand side. The item icon set 2-2 consists of a listening start icon 2-21, a tuned station name icon 2-22, a listening spot icon 2-23, listening stop icon 2-24 and a data reverse icon 2-25. The listening spot icon set 2-3 consists of an at-home listening icon 2-31, an in-car listening icon 2-32 and an icon 2-33 for outdoor listening and so forth.

Figure 3:
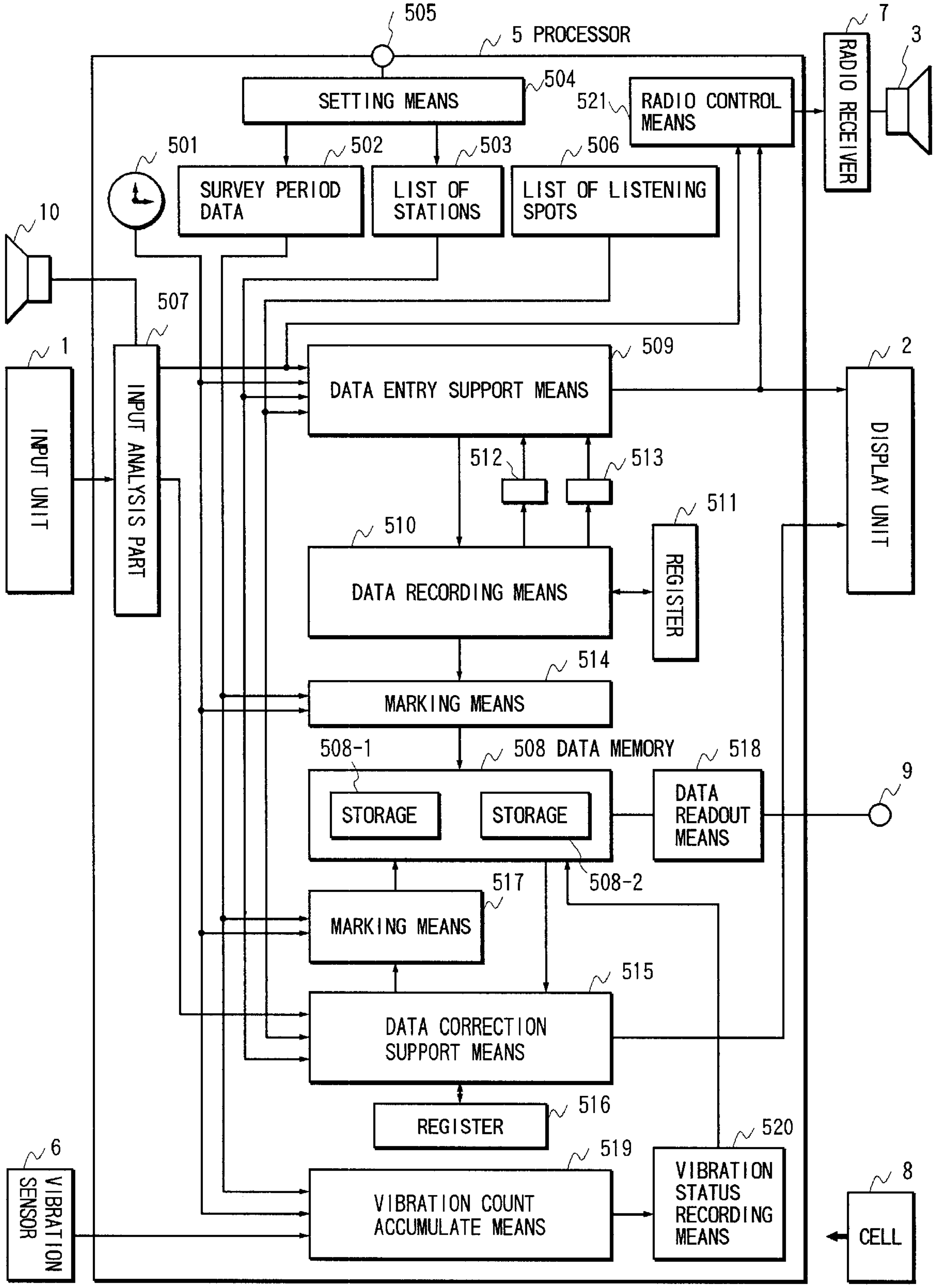
FIG. 3 is a block diagram illustrating an example of the internal configuration of the recorder according to the present invention.

Referring next to FIG. 3, the case 100 contains, in addition to the input unit 1, the display unit 2, the earphone 3 and the beeper 10 depicted in FIG. 1, a processor 5, a vibration sensor 6, a radio receiver 7, a battery 8 for power supply to the respective parts and a terminal 9 for reading out radio listening status data.

The vibration sensor 6 is formed by a mercury switch or the like, which detects vibrations above a certain level. The output from the vibration sensor 6 is provided to the processor 5.

The radio receiver 7 is a microminiature receiver that receives and reconstructs radio broadcast waves and outputs sounds from the earphone 3. To receive the radio broadcast waves, a built-in miniature antenna or a cord of the earphone 3 is used. The radio receiver 7 is not intended to listen to radio programs but is to specify the radio station of the program to which the sample subject carrying this device is listening, for example, outside his home. The ON-OFF operation and channel selection of the radio receiver 7 are placed under the control of the processor 5.

The processor 5 controls the entire system of the portable radio listening status recorder.

The processor 5 is made up of such various means as listed below.

Clock 501: Measures the current date and time. The clock is equipped with a calendar function of measuring time in terms of day as well as hour and minute. Since the ratings survey is mostly carried out over a time period of two weeks, there is no need of measuring time up to a month, but it is also possible to use a clock that measures time up to a month and a year.

Survey-Period Data Storage Part 502: Stores the survey start and stop dates and times.

List-of-Broadcasting-Stations Storage Part 503: Stores a list of broadcasting stations which are subject to monitoring for listener ratings survey. The list contains the names of the broadcasting stations, their transmitting frequencies and so forth.

Setting Means 504: Sets survey-period information in the storage part 502 and list-of-broadcasting-station information in the storage part 503 based on external data that is entered via a control terminal 505. This setting is done on the part of the rating company prior to the start of survey.

List-of-Listening-Spots Storage Part 506: Presets therein listening spots such as subject's home, car, outdoors and so forth.

Input Analysis Part 507: Detects the states of the push-buttons 1-1 to 1-5 of the input device 1, then determines the next processing of the processor 5 based on the current status and the push-button being pressed, and issues instructions to respective parts accordingly. Furthermore, this part causes the beeper to beep in synchronization with the user's manipulation of the push-buttons 1-1 through 1-5.

Data Memory 508: Comprises a storage part 508-1 for storing radio listening status data and a storage part 508-2 for storing the number of vibrations detected by the vibration sensor 6. The data memory 508 is formed, for example, by a RAM.

Data Entry Support Means 509: Supports the user in his newly entering radio listening status data. At the time of newly entering the radio listening status data by the user, the support means 509 displays input value candidates on the display unit 2 for each item, and then executes a process of sequentially changing the input value candidates in response to instructions from the user. The data entry support means 509 has entered therein the current date and time indicated by the clock 501, the list of broadcasting stations and the lists of listening spots stored in the storage means 503 and 506, respectively, in addition to the instructions from the input analysis part 507.

Data Recording Means 510: Receives the user's entered radio listening status data from the data entry support means 509, and records the received data in the storage part 508-1 of the data memory 508 via marking means 514.

Register 511: Temporarily holds the radio listening status data currently entered by the user.

Register 512: Holds data on the broadcasting station contained in the immediately preceding radio listening status data stored in the data memory 508.

Register 513: Holds data on the listening spot contained in the immediately preceding radio listening status data stored in the data memory 508.

Marking Means 514: Receives the radio listening status data from the data recording means 510, and writes the data into the storage part 508-1 of the data memory 508 together with a predetermined flag. The marking means 514 is also supplied with the current data and time indicated by the clock 501 and the survey stop date and time stored in the storage means 502 as well as the output from the data recording means 510, and sets the flag value at "1" or "0" depending on whether the current date and time are past the survey stop date and time.

Data Correction Support Means 515: Supports the user in his correction of the radio listening status data stored in the data memory 508. Following instructions from the input unit 1, the support means 515 displays on the display unit 2 an item value of the radio listening status data to be corrected, and then changes the item value from one input value to another. When the new value for correction is finally determined by the user, the support means 515 updates the initial input value in the data memory 508 with the new value via the marking means 517.

Register 516: Temporarily holds that one of the pieces of radio listening status data selected by the user as the object of correction.

Marking Means 517: Receives the corrected radio listening status data from the data correction support means 515, and writes the received data over the old data in the storage part 508-1 of the data memory 508. The marking means 517 is supplied with the current date and time shown by the clock 501 and the survey stop date and time stored in the storage means 502 as well as the output from the data correction support means 515. The flag value in the corrected radio listening status data is changed to "1" if the current date and time are past the survey stop date and time, and if not, the flag value is held unchange.

Data Readout Means 518: Following instructions from an external computer connected via a terminal 9, reads out the data stored in the data memory 508 and sends it to the external computer via the terminal 9. For example, RS232C interface is used in this case.

Vibration Count Accumulate Means 519: Receives the output from the vibration sensor 6, the current date and time shown by the clock 501 and the survey start and stop date and time stored in the storage means 502, and at predetermined time intervals (every 24 hours, for instance) from the survey start date and time to the survey stop date and time, accumulates the number of vibrations detected by the vibration sensor 6 during the time intervals.

Vibration Status Recording Means 520: Records accumulated value of the number of vibrations obtained with the accumulate means 519 in the storage part 508-2 of the data memory 508.

Radio Control Means 521: Holds the radio receiver 7 ON while the data entry support means 509 supports the user in his entering of the listening status data, and controls a tuner in the radio receiver 7 to select the same broadcasting station as that whose name is being displayed by the support means 509 on the display 2.

The processor 5 of the above configuration may also be implemented using, in combination, a microprocessor having a MPU, memories and I/O interface and programs stored in the memories. In this instance, the programs implement the above-described various means on the MPU by controlling its operation.

Next, a detailed description will be given of the operation of this embodiment of the construction described above.

(1) Distribution of the Device to Subject

The portable radio listening status recording device with the survey period data and the list of broadcasting stations stored in the storage means 502 and 503 via the setting means 504 is distributed to each subject from a rating company through a researcher.

(2) New Data Entry by Each Subject

Each subject carries the device with him during a predetermined period of survey. When starting to listen to a radio program at his home, in a car, outdoors, or at some other place, the subject enters the listening start date and time, the name of the broadcasting station tuned and the place of listening via the input unit 1. When the subject stops listening to the radio program, the subject enters the listening stop date and time via the input unit 1.

Figure 4:
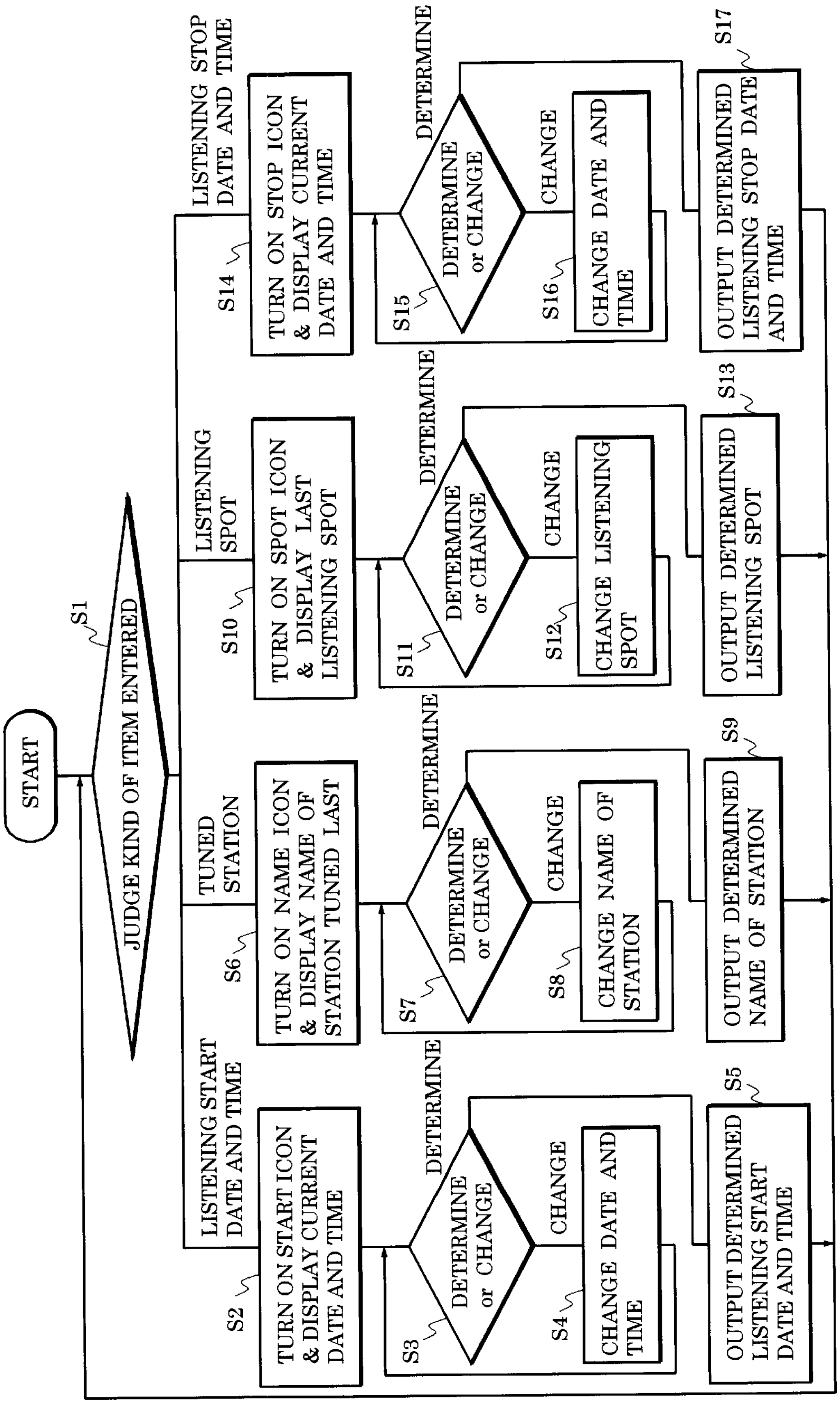
FIG. 4 is a flowchart showing an example of processing by data entry support means.

FIG. 4 is a flowchart depicting, by way of example, the operation of the data entry support means 509 which supports new data entry. When the user presses the menu option button 1-1 of the input unit 1, the input analysis part 507 judges the manipulation as the entry of the listening start date and time and indicates it to the data entry support means 509, which follows instructions from the input analysis part 507 to perform processing for supporting the entry of the listening date and time (steps S1, S2 to S5). Then, when the user presses the menu option button 1-1 again, the input analysis part 507 judges the manipulation as the entry of the name of the broadcasting station being selected and indicates it to the data entry support means 509, which follows instructions from the input analysis part 507 to perform processing for supporting the entry of the name of the selected broadcasting station (steps S1, S6 to S9). Next, when the user presses the menu option button 1-1 again, the input analysis part 507 judges the manipulation as the entry of the place of listening and indicates it to the data entry support means 509, which follows instructions from the input analysis part 507 to perform processing for supporting the entry of the place of listening (steps S1, S10 to S13). And, when the user presses the menu option button 1-1 once again, the input analysis part 507 judges the manipulation as the entry of the listening stop date and time and indicates it to the data entry support means 509, which follows instructions from the input analysis part 507 to perform processing for supporting the entry of the listening stop date and time (steps S1, S14 to S17). Incidentally, when the user presses the menu option button 1-1 once more, the input analysis part 507 judges the manipulation as the data reverse and starts the data correction support means 515, and when the menu option button 1-1 is pressed again, the processor returns to the initial state in which to enter the listening start date and time.

Figure 5:
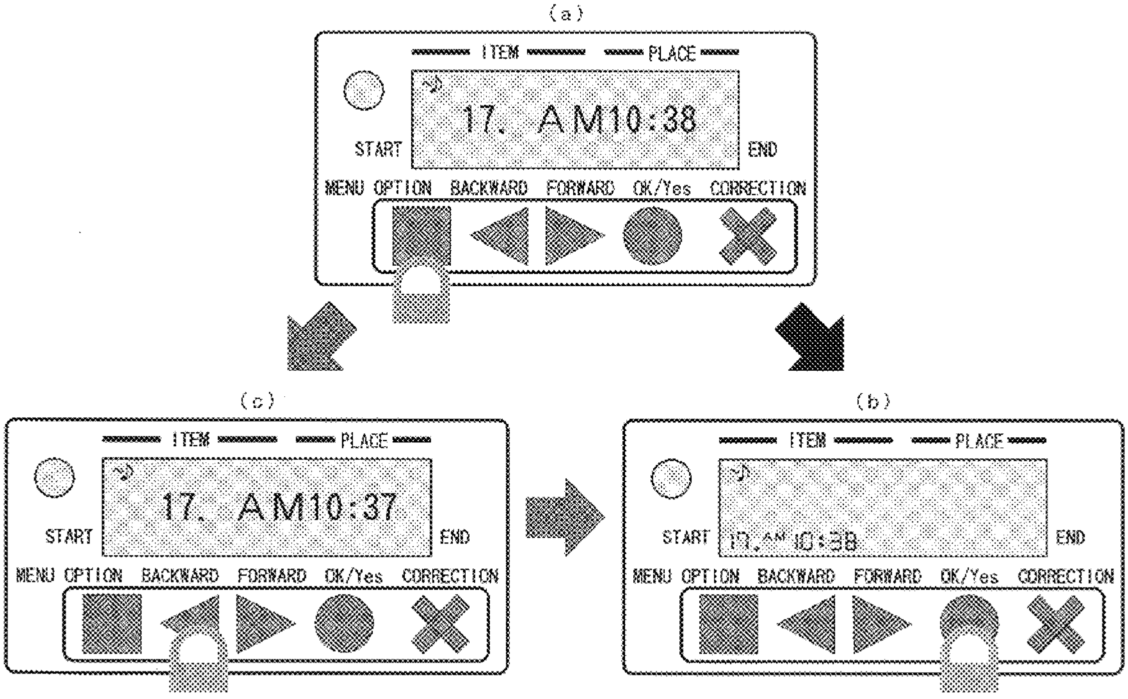
FIGS. 5(*a*)), 5(*b*) and 5(*c*) are each a plan view depicting the way in which the subject enters the listening start date and time into the recorder of the present invention.

The procedure for supporting the entry of the listening start date and time begins, as depicted in FIG. 5(*a*), with turning ON the listening start icon 2-21 on the display unit 2 and displaying in the character display area 2-1 the current date and time indicated by the clock 501 (step S2). Immediately after starting to listen to a radio program, the user needs only to press the OK button 1-4 as depicted in FIG. 5(*b*). On the depression of the OK button 1-4 (step S3), the data entry support means 509 determines that the current date and time are the listening start date and time, and displays the determined listening start date and time in the listening start date and time display area 2-4 and, at the same time, provides the finalized date and time to the data recording means 510 (step S5). On the other hand, when having forgotten to enter the listening start date and time although he began to listen to a radio program, the user presses the backward button 1-2 to go backward in time as shown in FIG. 5(*c*). While the backward button 1-2 is pressed, the data entry support means 509 causes the date and time displayed in the character display area 2-1 to move backward, for example, on a minute-by-minute basis. In this instance, however, when a predetermined time, for example, twelve o'clock midnight of the previous day, is reached, it is impossible to go further backward in time. Incidentally, the forward button 1-3 is to move forward in time but not past the current date and time. When the user presses the OK button 1-4 at the time the listening date and time is reached, the data entry support means 509 determines that the displayed date and time are the listening start date and time, and displays it in the listening start date and time display area 2-4 and, at the same time, provides the data to the data recording means 510 (step S5).

Figure 6:
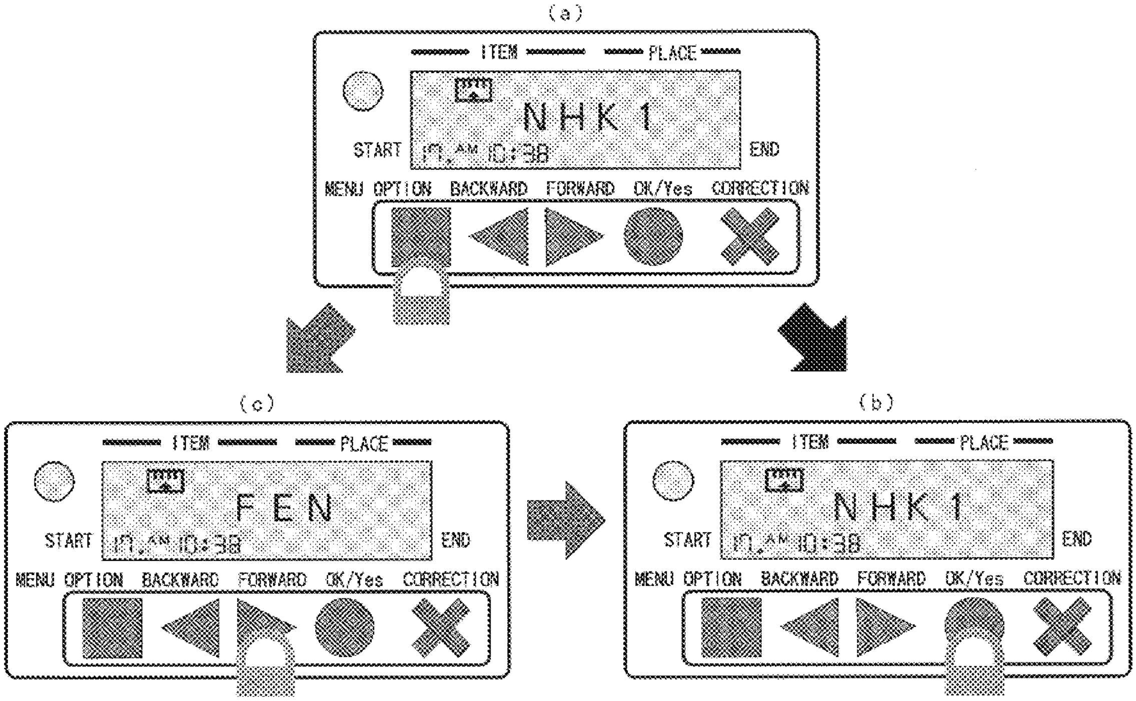
FIG. 6(*a*), 6(*b*) and 6(*c*) are each a plan view depicting the way in which the subject enters the name of the station to which he is listening into the recorder of the present invention.

The procedure for supporting the entry of the tuned station begins, as depicted in FIG. 6(*a*), with illuminating the tuned station name icon 2-22 of the display unit 2 and displaying in the character display area 2 the name of that station stored in the register 512 to which the user listened last (step S6). Incidentally, the display of the tuned station is provided by displaying its name and frequency alternately every second, for instance. If the displayed the tuned station is the same as that to which the user is listening, he presses the OK button 1-4 as depicted in FIG. 6(*b*). On the depression of the OK button 1-4, the data entry support means 509 determines that the displayed station is the currently tuned station (step S7), and sends the name of the thus determined station to the data recording means 510 (step S9). On the other hand, when the user is listening to a station different from the displayed station, the user has to press the backward button 1-2 or forward button 1-3 to change the name of the broadcasting station being displayed. On each pressing of the backward button 1-2 (step S7), the data entry support means 509 changes the displayed name of station backward by one in the list of broadcasting stations stored in the storage means 503, whereas when the forward button 1-3 is pressed, the displayed name of station goes forward by one in the stored list of broadcasting stations (step S8). When the user presses the OK button 1-4 at the time the name of the currently tuned station is displayed (step S7), the data entry support means 509 determines that the station currently displayed is the station to which the user is listening, and sends the thus determined name of the tuned station to the data recording means 510 (step S9).

On the other hand, when the input analysis part 507 instructs the date entry support means 509 to support the entry of the name of the tuned station, the instruction is provided to the radio control means 521 as well. While the data entry support means 509 performs the procedure for supporting the entry of the tuned station, the radio control means 521 keeps the radio receiver 7 in the ON state and controls the tuner of the radio receiver 7 to tune the station of the same name as that displayed in the character display area 2-1 of the display unit 2. Accordingly, in the state of FIG. 6(*a*) NHK1 (first radio program of the NHK) is selected by the radio receiver 7 and its sounds are output from the earphone 3, and in the state of FIG. 6(*c*) FEN is selected and its sounds are output from the earphone 3. Hence, when the user is confused about which radio station offers the radio program to which he is listening, he can recognize what radio program is being broadcast from which station by pulling out the earphone from the storage space 4 and holding it to his ear, and he can specify the currently tuned station by comparing the sounds from the earphone 3 and the sounds of the radio program to which he is actually listening.

Figure 7:
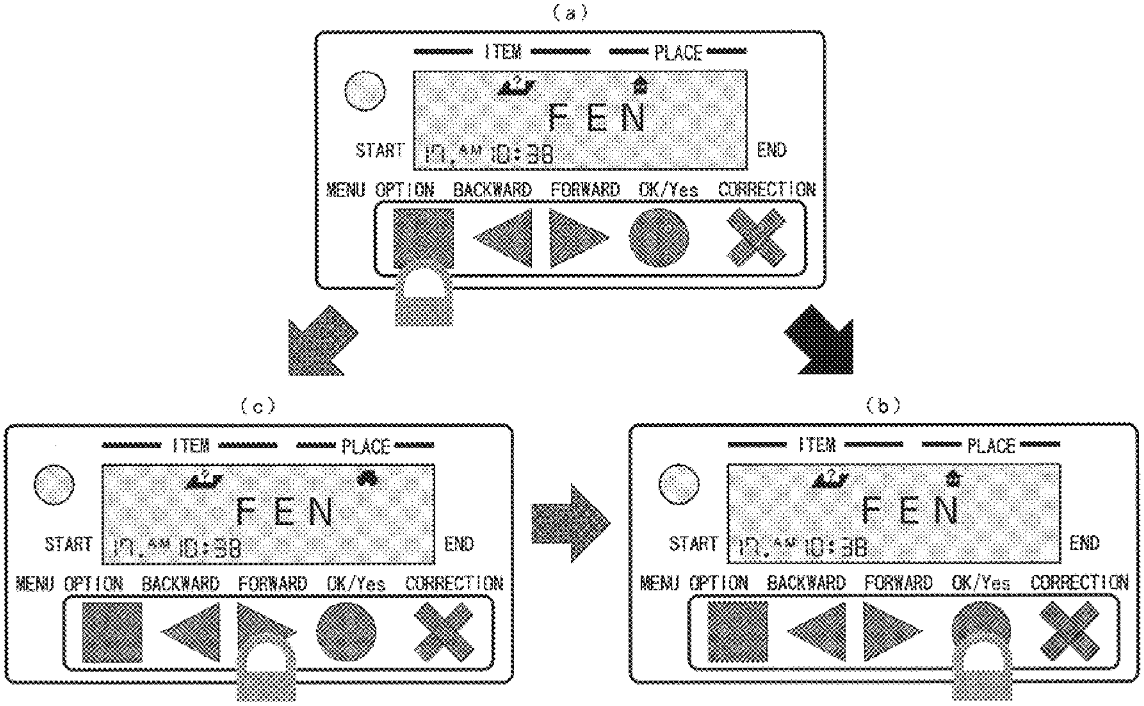
FIGS. 7(*a*), 7(*b*) and 7(*c*) are each a plan view depicting the way in which the subject enters the name of listening into the recorder of the present invention.

Next, the procedure for supporting the entry of the listening spot begins, as depicted in FIG. 7(*a*), with illuminating the listening spot icon 2-23 on the display unit 2 and displaying by the listening spot icon 2-3 the place stored in the register 514 where the user listened to the radio last (step S10). If the displayed place of listening is the same as the place where the user is currently listening to the radio, he presses the OK button 1-4 as depicted in FIG. 7(*b*). On the depression of the OK button 1-4, the data entry support means 509 determines that the place of listening on display is the current place of listening (step S11), and supplies the data recording means 510 with the data on the thus determined place of listening (step S13). On the other hand, when the user is listening to the radio at a place different from the displayed one, the user presses the backward button 1-2 or forward button 1-3 to change the display of the place of listening as shown in FIG. 7(*c*). On each pressing of the backward button 1-2 (step S11), the data entry support means 509 causes the listening spot icon displayed in the character display area 2-1 to move backward by one in the list of listening spot icons stored in the storage means 506, whereas when the forward button 1-3 is pressed, the displayed icon goes forward by one in the stored list of listening spots (step S12). When the user presses the OK button 1-4 at the time the current place of listening is displayed (step S11), the data entry support means 509 determines that the listening spot of the icon currently displayed is the place where the user is listening to the radio, and sends to the data recording means 510 the data on the thus determined place of listening (step S9).

Figure 8:
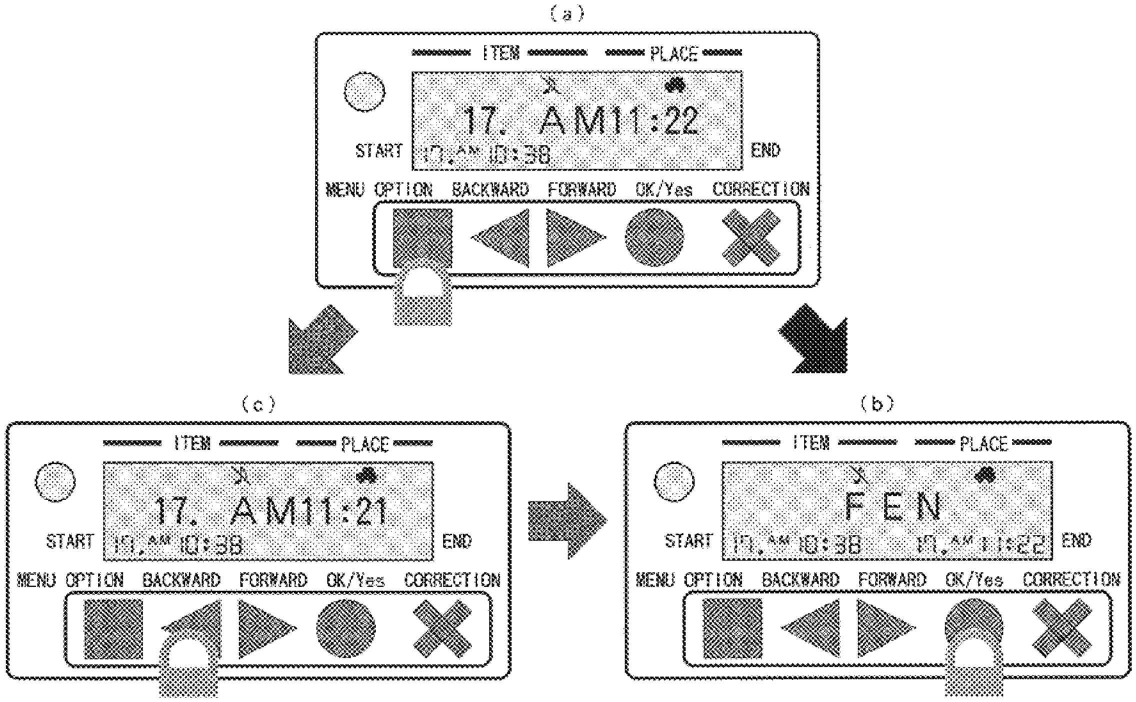
FIGS. 8(*a*), 8(*b*) and 8(*c*) are each a plan view depicting the way in which the subject enters the listening stop date and time into the recorder of the present invention.

Next, the procedure for supporting the entry of the listening stop date and time begins, as depicted in FIG. 8(*a*), with illuminating the listening stop icon 2-24 on the display unit 2 and displaying in the character display area 2-1 the current date and time indicated by the clock 501 (step S14). Immediately after stopping to listen to the radio, the user needs only to press the OK button 1-4 as depicted in FIG. 8(*b*). When the OK button 1-4 is pressed(step S15), the data entry support means 509 determines that the current date and time are the listening stop date and time, and displays the determined listening stop date and time in the listening stop date and time display area 2-5 and, at the same time, sends the data on the thus determined date and time to the data recording means 510 (step S 17). On the other hand, when having forgotten to enter the listening stop date and time although he stopped listening to the radio, the user presses the backward button 1-2 to go backward in time as shown in FIG. 8(*c*). While the backward button 1-2 is pressed, the data entry support means 509 causes the date and time displayed in the character display area 2-1 to move backward, for example, on a minute-by-minute basis. In this instance, however, to go back further than the listening start date and time is prohibited. Incidentally, the forward button 1-3 is to move forward in time but not past the current date and time. When the user presses the OK button 1-4 (step S15) at the time the listening stop date and time are displayed, the data entry support means 509 determines that the displayed date and time at this point in time are the listening stop date and time, and displays the thus determined date and time in the listening stop date and time display area 2-4 and, at the same time, sends the data to the data recording means 510 (step S17).

(3) Recording of New Data in Data Memory

Figure 9:
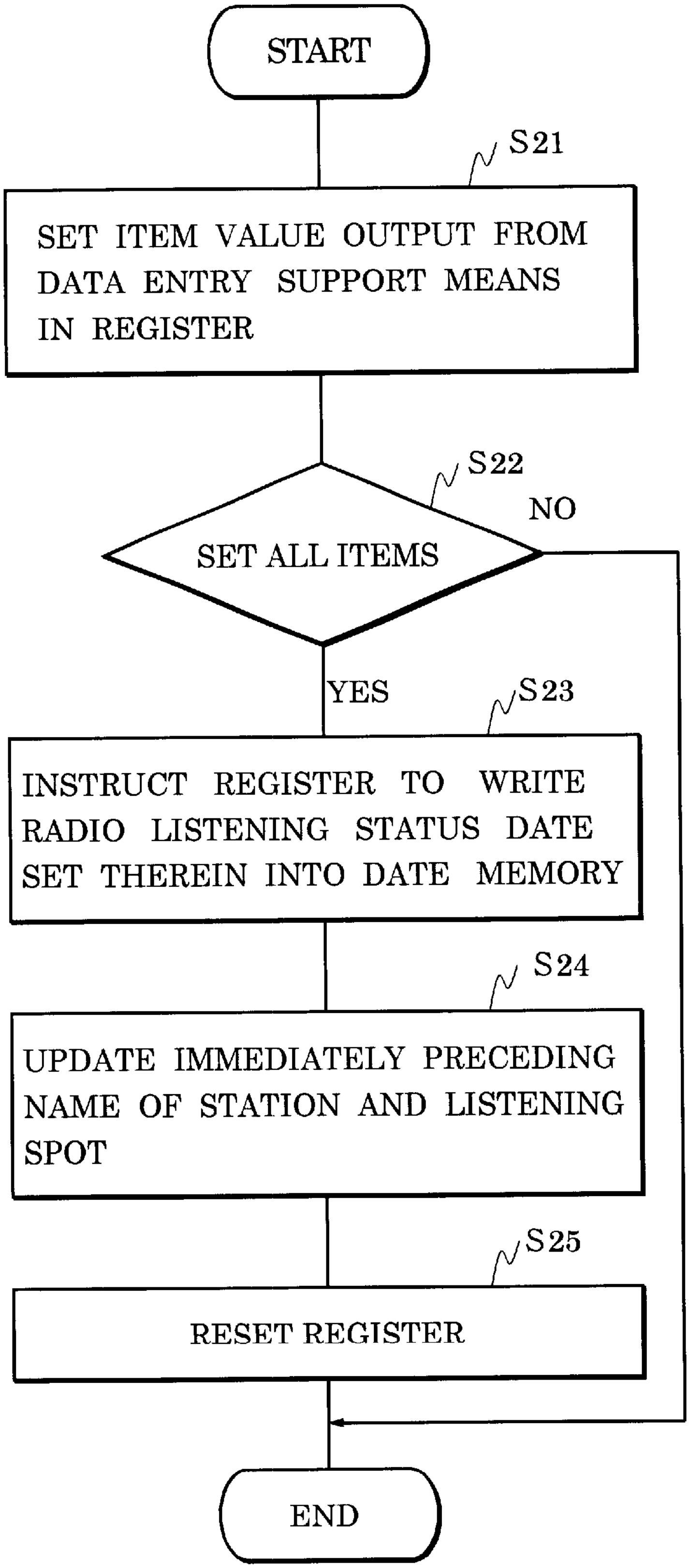
FIG. 9 is a flowchart showing an example of processing by data recording means.

Each time the data entry support means 509 outputs the determined value of each of the items about the listening start date and time, the tuned station, the place of listening and the listening stop date and time, the data recording means 510 performs the procedure depicted in FIG. 9. In the first place, the determined value from the data entry support means 509 is set in the register 511 (step S21), then a check is made to see if the determined values of all the items, that is, the listening start date and time, the tuned station, the place of listening and the listening stop date and time, have been set in the register 511 step S22), and if not, the current session of the procedure comes to an end. If all the determined values have been set, the data recording means sends to the marking means 514 the radio listening status data composed of the listening start date and time, the tuned station, the place of listening and the listening stop date and time set in the register 511, and instructs the marking means 514 to write the data into the date memory 508 (step S23). And, to update the user's last selected broadcasting station and listening spot, the name of the tuned station set in the register 511 is set in the register 512, and the place of listening set in the register 511 is set in the register 513 (step S24), followed by resetting the register 511 (step S25), with which the procedure ends.

Figure 10:
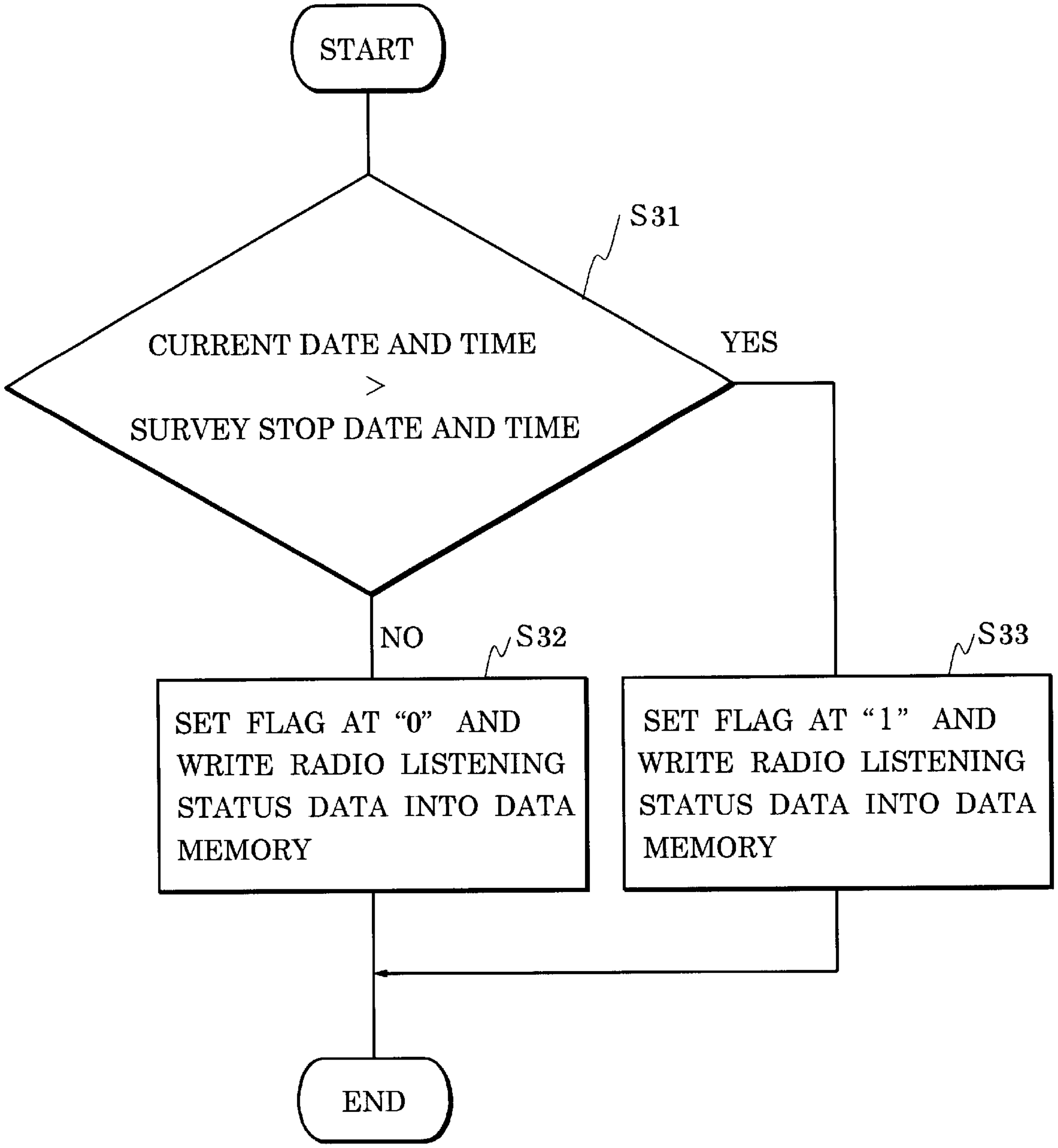
FIG. 10 is a flowchart showing an example of processing by marking means 514.

When instructed by the data recording means 510 to write the radio listening status data, the marking means 514 performs the procedure shown in FIG. 10. In the first place, the marking means 514 reads out the survey stop date and time from the storage means 502 and compares them with the current date and time indicated by the clock 501 (step S31). If the current date and time are earlier than the survey stop date and time (NO in step S31), then the application means 514 attaches a flag of a value "0" to the radio listening status data received from the data recording means and writes the data in the storage part 508-1 of the data memory 508 (step S32). On the other hand, if the current date and time are after the survey stop date and time, then the marking means 514 attaches a flag of a value "1" to the radio listening status data received from the date recording means 510 and writes the data into the storage part 508-1 of the data memory 508 (step S32).

Referring next to FIG. 11(*a*), an example of the format of one radio listening status data record stored in the storage part 508-1 begins with a header which indicates that the record is a radio listening status data record, the header being followed by the listening start date and time, then by the name of the tuned station, then by the place of listening, then by the listening stop date and time, and finally by the flag.

(4) Correction of Data in Data Memory

Figure 12:
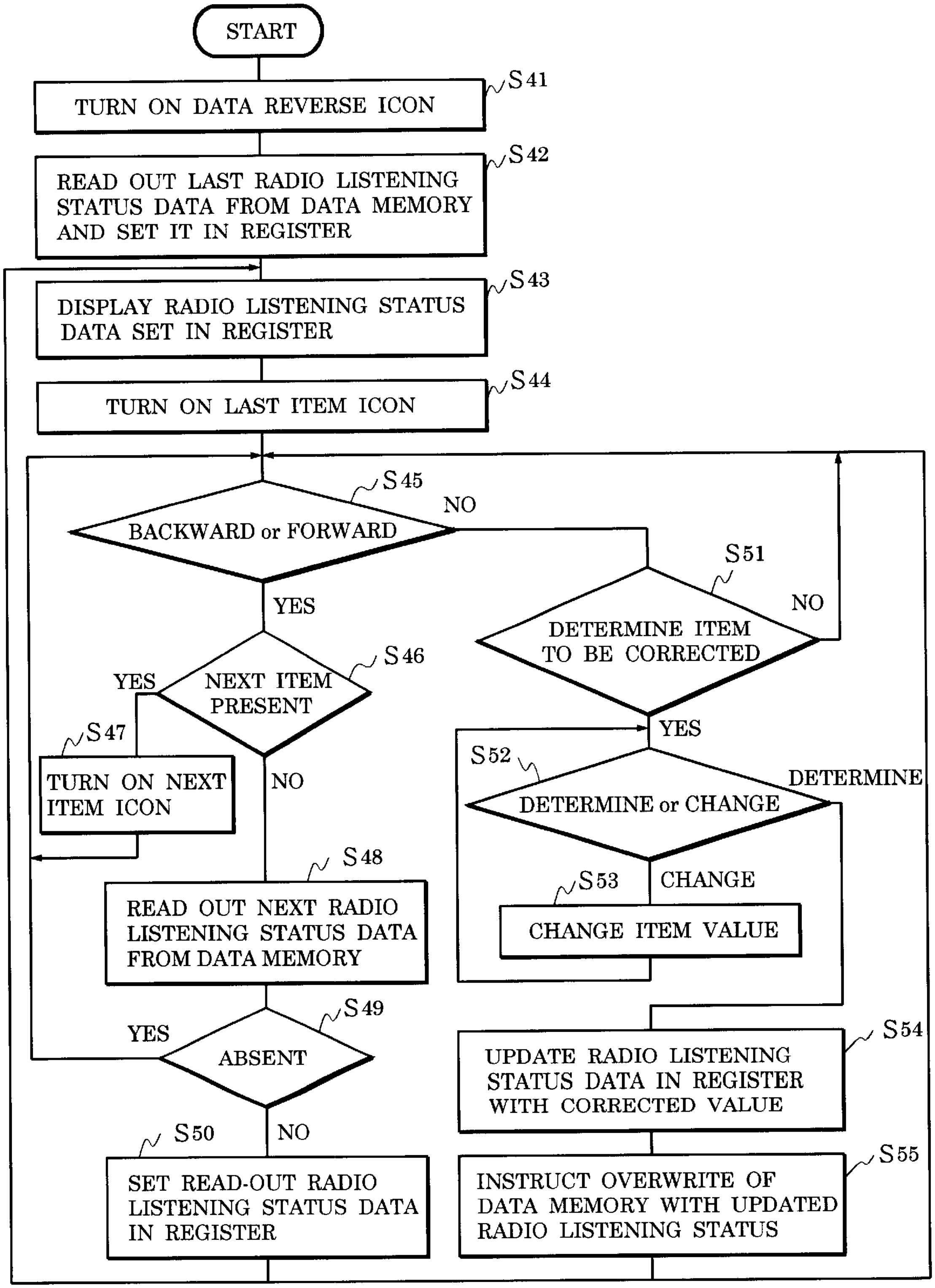
FIG. 12 is a flowchart showing an example of processing by data entry support means.

The input analysis part 507 starts the data correction support means 515 when the data reverse item is chosen by the user's pressing of the menu option button 1-1. The data correction support means 515 performs the procedure of FIG. 12 to support the correction of the radio listening status data in the data memory 508 by the user.

In the first place, the input analysis part 507 illuminates the data reverse icon 2-25 on the display unit 2 (step S41). Then, the support means 515 reads out the radio listening status data record stored last in the storage part 508-1 of the data memory 508 and sets it in the register 516 (step S42). And, the support means 515 reads out the contents of the radio listening status data record set in the register 516, then displays the recorded listening start date and time, tuned station, place of listening and listening stop date and time on the display unit 2 (step S43), and illuminates the icon of the last item, i.e. the listening stop icon 2-24, indicating to the user that the listening stop date and time can be corrected (step S44). This state corresponds to the display state shown in FIG. 8(*a*).

Thereafter, by pressing the backward button 1-2 of the input unit 1, the user appropriately changes the item of correction and, in some case, the record itself which is the object of correction. When the backward button 1-2 is pressed once, the data correction support means 515 illuminates the listening spot icon 2-23, indicating to the user that the place of listening in the record concerned can be corrected (steps S45, S47). When the backward button 1-2 is pressed again, the support means 515 illuminates the tuned station icon 2-22, indicating to the user that the tuned station in the record can be corrected (steps S45, S47). When the backward button 1-2 is pressed once more, the support means 515 illuminates the listening start icon 2-21, indicating to the user that the listening start date and time can be corrected (steps S45, S47). When the backward button 1-2 is pressed once again, the support means 515 reads out the second oldest radio listening status record from the storage part 508-1 of the data memory 508 (steps S46, S48) since the record has no item preceding the listening start date and time. Then, the support means 515 sets the thus read out status record in the register 516 (step S50), followed by a return to step S43. And, the support means reads out the contents of the radio listening status data record set in the register 516, then displays the recorded listening start date and time, tuned station, place of listening and listening stop date and time on the display unit 2 (step S43), and illuminates the listening stop icon 2-24 that is the icon of the last item, indicating to the user that the listening stop date and time can be corrected (step S44). Thereafter, whenever the backward button 1-2 is pressed, the support means 515 repeats the same processing as mentioned above, displaying pieces of past radio listening status data on the display unit 2 one by one. Incidentally, at the time when the listening start date and time of the oldest radio listening status data recorded in the data memory 508 are made correctable, it is no longer possible to go back any farther in time by pressing the backward button 1-2. And, on each pressing of the forward button 1-3, new radio listening status data is displayed contrary to the case of the backward button 1-2 being pressed, and the correctable item is changed from the listening start date and time to the tuned station, thence to the place of listening and thence to the listening stop date and time.

When having thus selected the item desired to correct in the radio listening status data desired to correct, the user presses the correction button 1-5. Upon pressing of the correction button 1-5 (step S51), the data correction support means 515 enters the state in which to receive a corrective value for the item made correctable at that point in time (steps S52, S53). In this state the user can specify the corrective value by pressing the backward and forward buttons 1-2 and 1-3 of the input unit 1. For example, when the correction button 1-5 is pressed in such a state as depicted in FIG. 8(*a*), the listening stop date and time displayed in the character display area 2-1 can be changed by the backward and forward buttons 1-2 and 1-3. In this case, however, it is impossible to move the listening stop date and time backward further than the listening start date and time and forward farther than the current date and time. The same is true of the correction of the listening start date and time. In this instance, it is inhibited to put the listening start date and time backward further than twelve o'clock midnight of the previous day and forward further than the current date and time. In the correction of the tuned station and the place of listening, those stored in the storage means 503 and 506 are sequentially read out therefrom and displayed by repeatedly pressing the forward and backward buttons 1-2 and 1-3.

And, when the user presses the OK button 1-4 (step S52) after correcting the item value, the data correction support means 515 updates the item value concerned in the register 516 with the corrective value (step S54), and instructs the marking means 517 to overwrite the updated radio listening status data in the data memory 508 (step S55), with which the procedure for correcting one item value ends.

Thereafter, the data correction support means 515 returns to step S45, getting ready for the correction of the next item value. The data correction support means 515 stops its operation following instructions from the input analysis part 507 at the point in time an item other than the data reverses item is selected by the manipulation of the menu option button 1-1 of the input unit 1.

(5) Overwriting of Corrected Data in Data Memory

Figure 13:
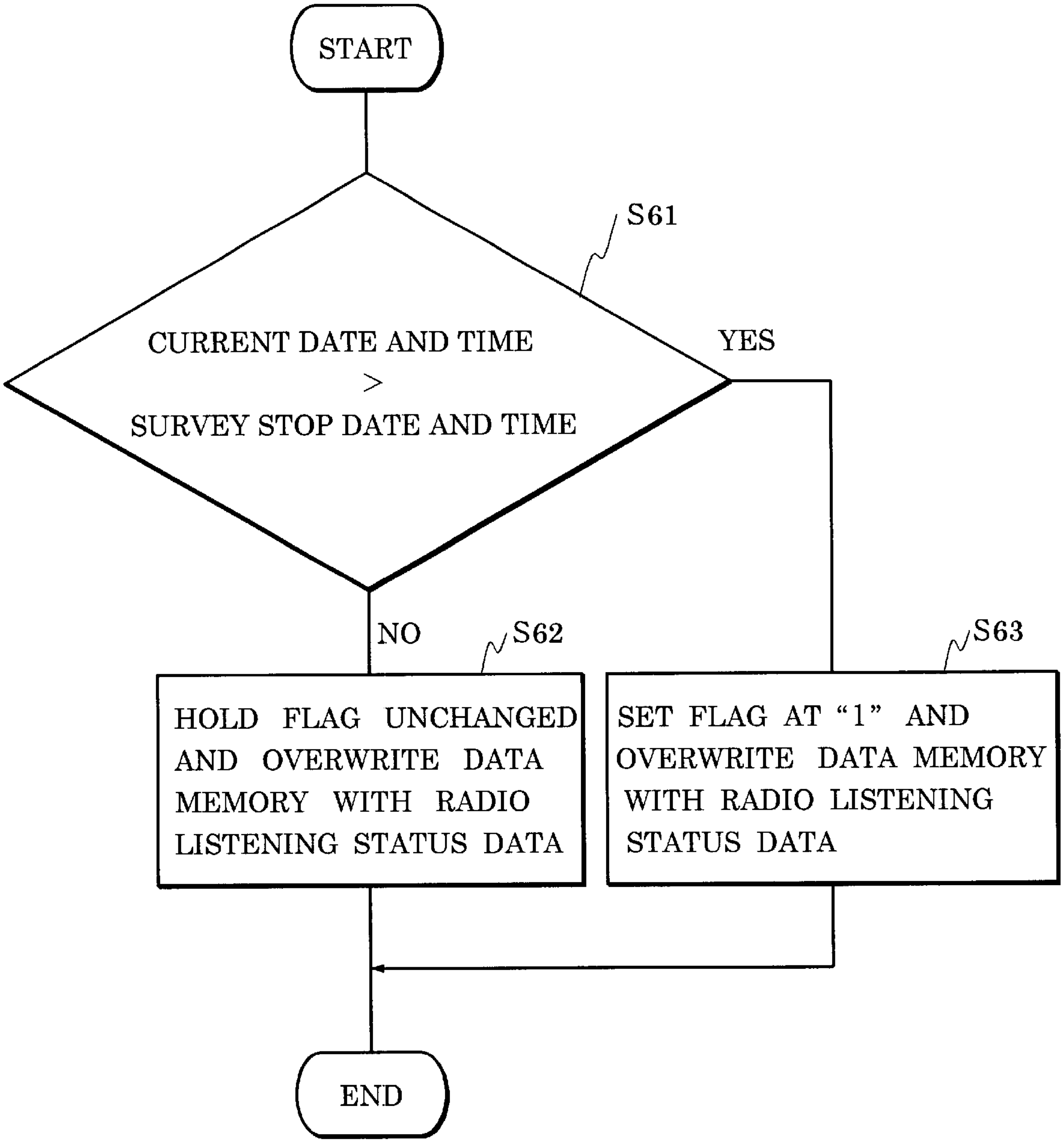
FIG. 13 is a flowchart showing an example of processing by marking means 517.

When instructed by the data correction support means 515 to overwrite the radio listening status data record, the marking means 517 performs the procedure depicted in FIG. 13. In the first place, the marking means 517 reads out the survey stop date and time from the storage means 502 and compares it with the current date and time indicated by the clock 501 (step S61). If the current date and time do not reach the survey stop date and time (NO at step S61), the marking means 517 overwrites the old record in the storage part 508-1 of the data memory 508 with the radio listening status data record received from the data correction support means 515 (step S62). On the other hand, if the current date and time have already reached the survey stop date and time, then the marking means 517 change the flag in the radio listening status data received from the data correction support means 515 to the value "1" and overwrites the old record in the storage part 508-1 with the new record (step S63).

(6) Recording of Vibration Count

Figure 14:
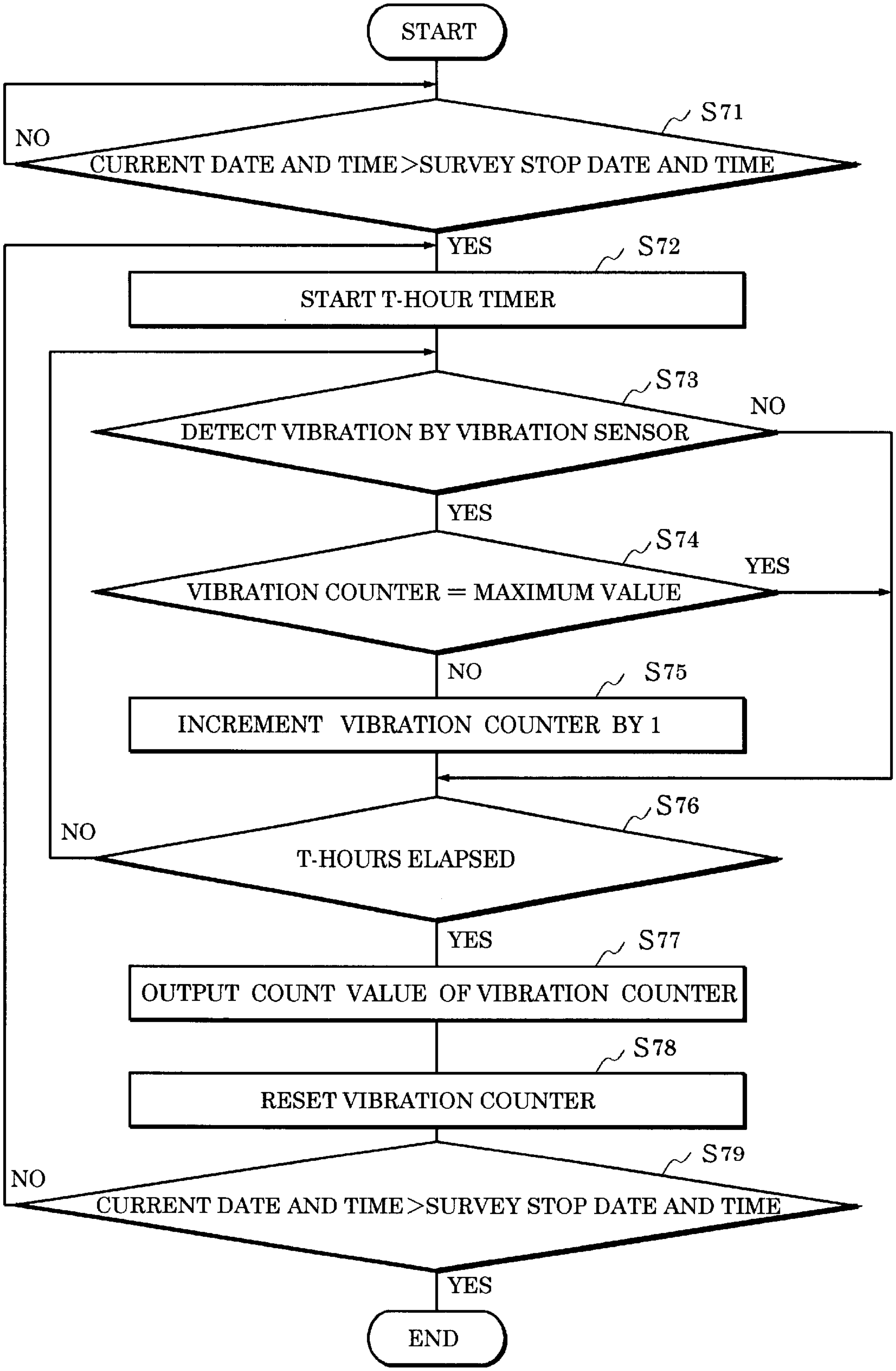
FIG. 14 is a flowchart showing an example of processing by vibration count accumulate means.

For example, when the survey period data is set in the storage means 502, the vibration count accumulate means 519 starts its operation and performs the procedure shown in FIG. 14. After starting, the accumulate means 519 compares the survey start date and time stored in the storage means 502 with the current date and time indicated by the clock 501 and waits until the survey start date and time are reached (step S71). When the survey start date and time are reached, the accumulate means 519 starts its internal T-hour timer (where T is 24 hours, for instance) (step S72) and increments its internal vibration counter by one upon each detection of vibration by the vibration sensor 6 during the time-out period of the T-hour timer (steps S73 to S76). A counter of, for example, about eight bits is enough to function as the vibration counter. Incidentally, when the vibration counter reaches its full count, its up-counting is stopped so as to prevent the counter from being resetting to zero (step S74). The point in time the T-hour timer times-out (step S76), the accumulate means 519 outputs the count value of the vibration counter to the vibration status recording means 520 (step S77) and rests the vibration counter to zero (step S78). And, the accumulate means 519 compares the survey stop date and time stored in the storage means 508 with the current date and time indicated by the clock 510 (step S79) and, if the current date and time do not reach the survey stop date and time, the accumulated means S19 returns to step S72 and continues the vibration count accumulating procedure, otherwise, finishes the procedure.

The vibration status recording means 520 records the vibration count from the vibration count accumulate means 518 in the recording part 508-2 of the data memory 508.

FIG. 11(*b*) shows an example of the format of one vibration count data record stored in the recording part 508-2, which begins with a header indicating that this record is a vibration count data record, and the header is followed by the vibration count and period information recorded in this order. The period information is provided in the form of a serial number starting with 1, for instance. If the period of the T-hour timer is fixed, the period over which to detect the vibration count of each record is uniquely determined from the survey start date and time, the T hours and the serial number indicted by the period information.

(7) Collection of Devices from Subjects

After the survey period the device distributed to each subject is collected by a researcher and returned to the rating company. In the rating company, a computer is connected to the terminal 9 of each device, and the radio listening status data records and the vibration count data records stored in the storage parts 508-1 and 508-2 of the data memory 508, respectively, are read via the data readout means 518 into a memory of the computer for analysis.

In the analysis, the radio listening data record with the flag set at "1" is regarded as data newly added or corrected by the researcher after the survey period. Furthermore, the correlation between the radio listening status data and the vibration count for each predetermined period, both read out of the same device, is checked to estimate the credibility of the recorded radio listening status data. After radio listening status data judged as apparently altered or seriously lacking credibility, based on the results of the analysis, is excluded, the other remaining pieces of data are subjected to statistic processing by the computer to obtain listening rate for each tuned station.

In the above embodiment, the marking means 514 and 517 are used to mark the radio listening status data newly recorded in the data memory 508 and radio listening status data corrected after the expiration of the survey period, thereby enabling the rating company to detect frauds by researchers. It is also possible to employ, as a substitute for the marking means 514, means for inhibiting the recording of radio listening status data in the data memory 508 after the expiration of the survey period. This inhibit means writes the radio listening status data into the data memory 508 in step S32 in FIG. 10 but inhibits the writing in step S33. Similarly, the marking means 517 may also be replaced with inhibit means for inhibiting the correction of the radio listening status data stored in the data memory 508 after the expiration of the survey period. In this case, the inhibit means permits the overwriting of the old data in the data memory 508 with the radio listening status data in step S62 in FIG. 13 but inhibits the overwriting in step S63.

It is also possible to effect various other modifications and variations such as means for sounding the beeper 10 for a fixed period of time when detecting that the input unit 1 has been left unmanipulated for more than a certain time, or means for displaying on the display screen of the display unit 2 a message indicating the contents of manipulation that the sample subject has to do next.

What is claimed is:

1. A portable radio listening status recorder which is carried by a subject for a radio listener rating survey, comprising:

- a display unit;
- an input unit; and
- a processor;
- wherein said processor comprises:
  - a data memory;
  - data entry support means for supporting said subject in his newly entering radio listening status data containing items of at least a listening start date and time, a name of a tuned station, a place of listening and a listening stop date and time via said input unit;
  - data recording means for recording in said data memory said radio listening status data containing values of said items entered with the support of said data entry support means and finally determined by said subject; and
  - data readout means for reading out said data from said data memory for output to an external; terminal,
  - wherein said data entry support means displays the current date and time as an input value candidate at the time of entering the listening start date and time and then sequentially changes said current date and time to the next candidate in response to instructions from said input unit and, at the time of entering the name of the tuned station, displays as an input value candidate the same tuned station name as contained in an immediately previously recorded radio listening status data and then sequentially changes the tuned station to those contained in a list of preselected stations in response to instructions from said input unit.

2. A portable radio listening status recorder which is carried by a subject for a radio listener rating survey, comprising:

- a display unit;
- an input unit; and
- a processor;
- wherein said processor comprises:

a data memory;

data entry support means for supporting said subject in his newly entering radio listening status data containing items of at least a listening start date and time, a name of a tuned station, a place of listening and a listening stop date and time via said input unit;

data recording means for recording in said data memory said radio listening status data containing values of said items entered with the support of said data entry support means and finally determined by said subject; and data readout means for reading out said data from said data memory for output to an external terminal, wherein said data entry support means displays the current date and time as an input value candidate at the times of entering the listening start date and time and the listening stop date and time then sequentially changes said current date and time to the next candidate in response to instructions from said input unit and, at the times of entering the name of the tuned station and the place of listening, displays as input value candidates the same tuned station name and place of listening as contained in immediately previously recorded radio listening status data and then sequentially changes the tuned station and the place of listening to those contained in lists of preselected stations and places of listening in response to instructions from said input unit.

3. A portable radio listening status recorder which is carried by a subject for a radio listener rating survey, comprising:

a display unit;

an input unit; and a processor;

wherein said processor comprises:

a data memory;

data entry support means for supporting said subject in his newly entering radio listening status data containing items of at least a listening start date and time, a name of a tuned station, a place of listening and a listening stop date and time via said input unit;

data recording means for recording in said data memory said radio listening status data containing values of said items entered with the support of said data entry support means and finally determined by said subject; and data readout means for reading out said data from said data memory for output to an external terminal, wherein said processor further comprises data correction support means for supporting an operation that said user corrects said radio listening status data recorded in said data memory, said data correction support means displays, as an input value, a value of a radio listening status data item to be corrected on said display unit in response to instructions from said input unit and then sequentially changes said input value in response to instructions from said input unit, updating the old input value with an input value finally determined by said user, which further comprises a vibration sensor connected to said processor and wherein said processor further comprises:

vibration count accumulate means for accumulating, at predetermined time intervals at least from the radio listening status survey start time to the stop time, the numbers of vibrations detected by said vibration sensor during the respective time intervals; and vibration status recording means for recording in said data memory an accumulated value of vibration counts obtained by said vibration count accumulate means for each predetermined period of time.

4. A portable radio listening status recorder which is carried by a subject for a radio listener rating survey, comprising:

a display unit;

an input unit; and a processor;

wherein said processor comprises:

a data memory;

data entry support means for supporting said subject in his newly entering radio listening status data containing items of at least a listening start date and time, a name of a tuned station, a place of listening and a listening stop date and time via said input unit;

data recording means for recording in said data memory said radio listening status data containing values of said items entered with the support of said data entry support means and finally determined by said subject; and data readout means for reading out said data from said data memory for output to an external terminal, wherein said processor further comprises data correction support means for supporting an operation that said user corrects said radio listening status data recorded in said data memory, said data correction support means displays, as an input value, a value of a radio listening status data item to be corrected on said display unit in response to instructions from said input unit and then sequentially changes said input value in response to instructions from said input unit, updating the old input value with an input value finally determined by said user, wherein said processor further comprises marking means for appending a special mark to radio listening status data recorded by said data recording means in said data memory after the radio listening status survey stop time.

5. A portable radio listening status recorder which is carried by a subject for a radio listener rating survey, comprising:

a display unit;

an input unit; and a processor;

wherein said processor comprises:

a data memory;

data entry support means for supporting said subject in his newly entering radio listening status data containing items of at least a listening start date and time, a name of a tuned station, a place of listening and a listening stop date and time via said input unit;

data recording means for recording in said data memory said radio listening status data containing values of said items entered with the support of said data entry support means and finally determined by said subject; and data readout means for reading out said data from said data memory for output to an external terminal, wherein said processor further comprises data correction support means for supporting an operation that said user corrects said radio listening status data recorded in said data memory, said data correction support means displays, as an input value, a value of a radio listening status data item to be corrected on said display unit in response to instructions from said input unit and then sequentially changes said input value in response to instructions from said input unit, updating the old input value with an input value finally determined by said user, wherein said processor further comprises marking means for appending a special mark to that radio listening status data stored in said data memory which was corrected by said data correction support means after the radio listening status survey stop time.

6. A portable radio listening status recorder which is carried by a subject for a radio listener rating survey, comprising:

a display unit;

an input unit; and a processor;

wherein said processor comprises:

a data memory;

data entry support means for supporting said subject in his newly entering radio listening status data containing items of at least a listening start date and time, a name of a tuned station, a place of listening and a listening stop date and time via said input unit;

data recording means for recording in said data memory said radio listening status data containing values of said items entered with the support of said data entry support means and finally determined by said subject; and data readout means for reading out said data from said data memory for output to an external terminal, wherein said processor further comprises data correction support means for supporting an operation that said user corrects said radio listening status data recorded in said data memory, said data correction support means displays, as an input value, a value of a radio listening status data item to be corrected on said display unit in response to instructions from said input unit and then sequentially changes said input value in response to instructions from said input unit, updating the old input value with an input value finally determined by said user, wherein said processor further comprises inhibit means for inhibiting the correction of radio listening status data by said data correction support means after the radio listening status survey stop time.

7. A portable radio listening status recorder which is carried by a subject for a radio listener rating survey, comprising:

a display unit;

an input unit; and a processor;

wherein said processor comprises:

a data memory;

data entry support means for supporting said subject in his newly entering radio listening status data containing items of at least a listening start date and time, a name of a tuned station, a place of listening and a listening stop date and time via said input unit;

data recording means for recording in said data memory said radio listening status data containing values of said items entered with the support of said data entry support means and determined to be final by said subject;

data readout means for reading out said data from said data memory for output to an external terminal; and a vibration sensor connected to said processor and wherein said processor further comprises: vibration count accumulate means for accumulating, at predetermined time intervals at least from the radio listening status survey start time to the stop time, the numbers of vibrations detected by said vibration sensor during the respective time intervals; and vibration status recording means for recording in said data memory an accumulated value of vibration counts obtained by said vibration count accumulate means for each predetermined period of time.

8. A portable radio listening status recorder which is carried by a subject for a radio listener rating survey, comprising:

a display unit;

an input unit; and a processor;

wherein said processor comprises:

a data memory;

data entry support means for supporting said subject in his newly entering radio listening status data containing items of at least a listening start date and time, a name of a tuned station, a place of listening and a listening stop date and time via said input unit;

data recording means for recording in said data memory said radio listening status data containing values of said items entered with the support of said data entry support means and determined to be final by said subject;

data readout means for reading out said data from said data memory for output to an external terminal; and wherein said processor further comprises marking means for appending a special mark to radio listening status data recorded by said data recording means in said data memory after the radio listening status survey stop time.

9. A portable radio listening status recorder which is carried by a subject for a radio listener rating survey, comprising:

a display unit;

an input unit; and a processor;

wherein said processor comprises:

a data memory;

data entry support means for supporting said subject in his newly entering radio listening status data containing items of at least a listening start date and time, a name of a tuned station, a place of listening and a listening stop date and time via said input unit;

data recording means for recording in said data memory said radio listening status data containing values of said items entered with the support of said data entry support means and determined to be final by said subject;

data readout means for reading out said data from said data memory for output to an external terminal; and wherein said processor further comprises marking means for appending a special mark to that radio listening status data stored in said data memory which was corrected by said data correction support means after the radio listening status survey stop time.

10. A portable radio listening status recorder which is carried by a subject for a radio listener rating survey, comprising:

a display unit;

an input unit; and a processor;

wherein said processor comprises:

a data memory;

data entry support means for supporting said subject in his newly entering radio listening status data containing items of at least a listening start date and time, a name of a tuned station, a place of listening and a listening stop date and time via said input unit;

data recording means for recording in said data memory said radio listening status data containing values of said items entered with the support of said data entry support means and determined to be final by said subject;

data readout means for reading out said data from said data memory for output to an external terminal; and wherein said processor further comprises inhibit means for inhibiting the correction of radio listening status data by said data correction support means after the radio listening status survey stop time.

* * * * *